(12) United States Patent
Inoue

(10) Patent No.: US 6,961,478 B2
(45) Date of Patent: Nov. 1, 2005

(54) IMAGE PROCESSING APPARATUS, IMAGE PROCESSING METHOD, AND RECORDING MEDIUM

(75) Inventor: Hitoshi Inoue, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 626 days.

(21) Appl. No.: 09/896,624

(22) Filed: Jun. 29, 2001

(65) Prior Publication Data

US 2002/0012477 A1 Jan. 31, 2002

(30) Foreign Application Priority Data

Jun. 30, 2000 (JP) .................................. 2000-197980
Jun. 25, 2001 (JP) .................................. 2001-191852

(51) Int. Cl.$^7$ ................................................ G06K 9/36
(52) U.S. Cl. .................... 382/284; 382/282; 382/294; 358/540; 358/450; 358/453
(58) Field of Search .......................... 382/228, 282, 382/284, 294, 287, 295; 358/538, 540, 450, 453

(56) References Cited

U.S. PATENT DOCUMENTS

| | | | | |
|---|---|---|---|---|
| 4,684,893 A | * | 8/1987 | Kojima et al. | 324/312 |
| 5,210,600 A | * | 5/1993 | Hirata | 358/527 |
| 5,778,044 A | * | 7/1998 | Bruijns | 378/98.7 |
| 6,005,987 A | * | 12/1999 | Nakamura et al. | 382/294 |
| 6,128,416 A | * | 10/2000 | Oura | 382/284 |
| 6,225,804 B1 | * | 5/2001 | Lai | 324/309 |
| 6,393,162 B1 | * | 5/2002 | Higurashi | 382/284 |

FOREIGN PATENT DOCUMENTS

| | | |
|---|---|---|
| EP | 0 875 857 A2 | 11/1998 |
| JP | 4-326267 | 11/1992 |
| JP | 6-165775 | 6/1994 |
| JP | 7-177432 | 7/1995 |
| JP | 2000-132663 | 5/2000 |
| JP | 2000-162663 | 6/2000 |

OTHER PUBLICATIONS

Busko I."Quadrant DC Offset Removal in NICMOS Image Using an Eye–Pleasing Criterion." Astronomical Data Analysis Software and Systems VIII. Nov. 1–4, 1998 vol. 172, pp. 341–344.

European Search Report, dated Sep. 5, 2003.

* cited by examiner

*Primary Examiner*—Bhavesh M. Mehta
*Assistant Examiner*—Yosef Kassa
(74) *Attorney, Agent, or Firm*—Morgan & Finnegan, LLP

(57) ABSTRACT

When a single X-ray image is formed by compositing a plurality of partial X-ray images, level differences among partial images are corrected. The level difference values at the boundary portions among partial images are statistically calculated using information of an image captured before the partial images to be corrected, and calculating correction values. An image is corrected using the calculated correction values. A system for calculating the correction values, and a system for correcting the partial images are built and driven independently.

21 Claims, 13 Drawing Sheets

FIG. 3

| | P | COEFFICIENT OF x(n−2) | COEFFICIENT OF x(n−1) | COEFFICIENT OF x(n) | x(n+1) | COEFFICIENT OF x(n+2) | COEFFICIENT OF x(n+3) | COEFFICIENT OF x(n+4) |
|---|---|---|---|---|---|---|---|---|
| 1ST TERM | P=1 | | −1/2 | 1/2 | | −1/2 | 1/2 | |
| | P=2 | −1/4 | | 1/4 | | −1/4 | | 1/4 |
| 2ND TERM | | | | | | 1 | | |
| 3RD TERM | | | | −1 | | | | |
| SUM TOTAL | | c(−2)=−1/4 | c(−1)=−1/2 | c(0)=−1/4 | c(1)=0 | c(2)=1/4 | c(3)=1/2 | c(4)=1/4 |

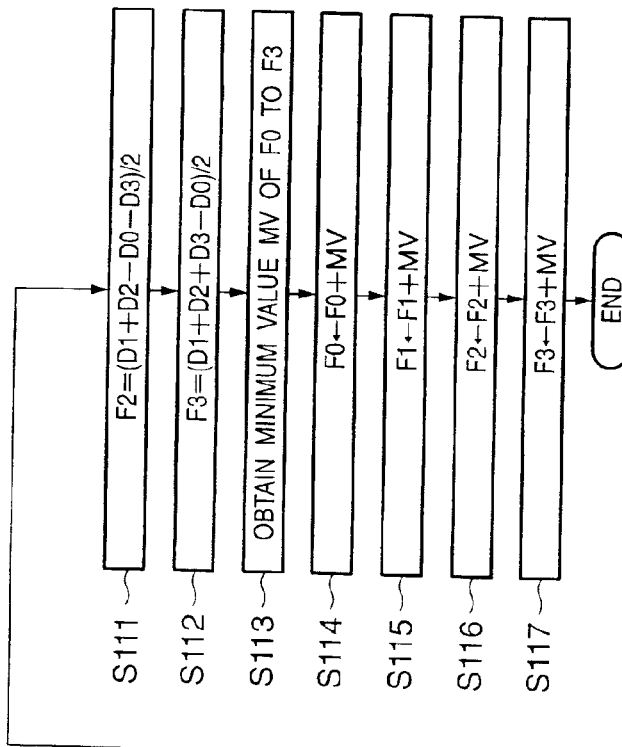
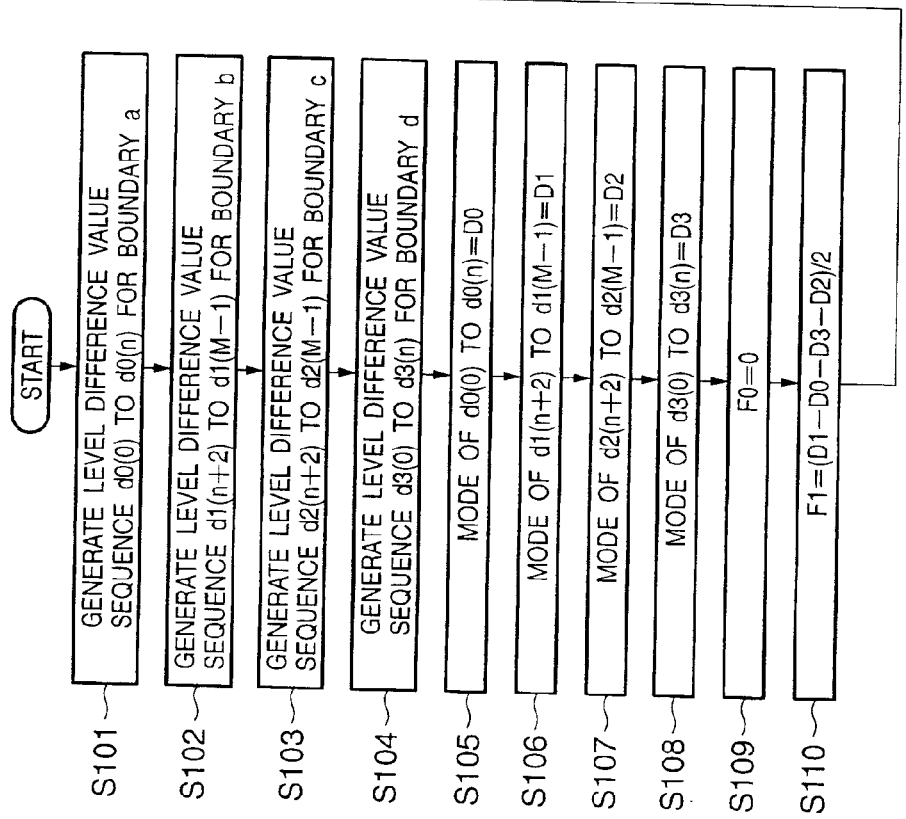
FIG. 4

IMAGE PROCESSING APPARATUS, IMAGE PROCESSING METHOD, AND RECORDING MEDIUM

FIELD OF THE INVENTION

The present invention relates to an image processing technique and, more particularly, to an image processing technique for compositing a plurality of partial images.

BACKGROUND OF THE INVENTION

As recent means for obtaining an image of an object (especially, an image inside a human body) by X-ray irradiation, the spatial distribution of X-ray intensities is directly converted into an electrical signal using a large X-ray sensor panel, the electrical signal is converted into a digital value by analog-to-digital (A/D) conversion, the digital value is input into a computer to form a digital image, and the digital image is used for saving, an image process, and observation.

In order to sense a chest image of a human body at one time, a sensor panel having a size of about 40 cm×40 cm is brought into nearly contact with the human body and is irradiated with X-rays from a direction opposite of the sensor panel to the human body, and the intensity distribution of X-ray transmitted through the human body is acquired by the sensor panel. In order to sense the detailed structure of the human body, a pixel resolution as high as 0.1 to 0.2 $mm^2$ is required by the sensor and one image consists of 2000×2000 to 4000×4000 pixels. Thus, the amount of image data becomes very large.

As a method for quickly and stably reading image information of a large X-ray sensor panel, basically, the following two methods are used.

(1) One large sensor panel is formed by combining relatively small partial sensor panels, similar to arrangement of tiles. The individual partial sensor panels are driven in parallel to obtain an A/D convert images.

(2) When a single large sensor panel is used, the sensor is divisionally driven in small portions, and independent amplifiers and A/D converters are connected to these portions to acquire data, so as to attain high-speed image data capture or to shorten the data wiring length on the sensor panel.

That is, it is difficult for a single system to quickly and stably acquire data since the size of the sensor panel as well as the image data size are large.

When a plurality of systems are used in place of a single system to obtain an image by part, the characteristics of the amplifiers, A/D converters, and the like, used in the systems, for processing respective image signals vary independently due to environmental change, aging, and so on.

FIG. 13 shows a system arrangement for capturing a normal X-ray image. In this case, one sensor panel is divided into four regions $1a$ to $1d$, which are driven independently. Independent amplifiers $2a$ to $2d$ amplify electrical signals output from the regions $1a$ to $1d$ with gains, A/D converters $3a$ to $3d$ convert the output signals from the amplifiers $2a$ to $2d$ into digital values, and independent DMA controllers $4a$ to $4d$ store partial image data in parallel into a frame memory 5. A line 15 is a bus line of this system, and a central processing unit (CPU) 9 sequentially executes programs stored in a program memory 16 to process data via the bus 15 in this computer system. The frame memory 5 is a dual-port memory from which image data is read out as the CPU 9 controls the read address.

The image sensing sequence is as follows. An irradiation controller 12 for an X-ray bulb controls an X-ray generator 13 (bulb) to emit X-rays toward an object (human body) 14. In synchronism with the X-ray irradiation, panel drivers (not shown) drive the sensor panel regions $1a$ to $1d$ (to sequentially drive internal switching transistors) to output electrical signals corresponding to pixels, thus storing an image in the frame memory 5 via the amplifiers $2a$ to $2d$, A/D converters $3a$ to $3d$, and DMA controllers $4a$ to $4d$.

Reference numeral 6 denotes a frame memory. Similar operation as described above is made without emitting any X-rays in order to capture a fixed pattern representing an offset in the frame memory 5, and that pattern is stored in the frame memory 6. Reference numeral 8 denotes a memory which pre-stores gain variation information of each pixel of the sensor panel regions $1a$ to $1d$. This information is normally obtained by irradiating the sensor with X-rays without any object, and capturing that image. The fixed pattern is removed from the captured image, and the resultant image is converted into a logarithmic value.

Reference numeral 20 denotes a look up table (LUT) used for converting pixel data from which the fixed pattern stored in the frame memory 6 is subtracted by a subtractor 24 into a logarithmic value, and outputs the logarithmic value. A subtractor 23 subtracts gain variation data held in the memory 8 from the image data converted into the logarithmic value. A memory 18 pre-stores the positions of pixels that cannot be corrected by using gain variation data (pixels themselves are defective and no data are obtained therefrom), and a defect correction unit 19 corrects pixel data output from the subtractor 23 by interpolating data at the defective pixel positions stored in the memory 18 from surrounding non-defective pixel values. The corrected data is converted into an analog video signal again, and the converted signal is displayed on a monitor 21. In this method, data can be processed while capturing image data, and a plurality of images can be successively processed. Hence, an X-ray moving image that displays the motion of an object can be displayed.

A moving image is often saved as a file in a storage device 11 such as a magnetic storage device, large-capacity non-volatile storage device, or the like, or is often output to an external display device, recording device, or storage device via an interface (not shown).

In this case, since partial image data obtained by independently driving the sensor panel regions $1a$ to $1d$ are normalized using the fixed pattern held in the frame memory 6 and the gain variation pattern held in the memory 8, the observer does not notice that an image obtained by compositing partial image data is made up of images captured for respective regions.

In the aforementioned basic operation, the gain variation data for respective pixels held in the memory 8 are obtained by irradiating the sensor with X-rays without any object, and is difficult to obtain for each image sensing in a normal medical facility. The data is sensed, e.g., once per day. Also, the fixed pattern held in the frame memory 6 is obtained at a time very close to the image sensing time but not at the same time. The capture time difference between the correction data held in the frame memory 6 and memory 8 and image data obtained by sensing an object corresponds to environmental differences (temperature, humidity, and the like) upon capturing those data, and the characteristics of the partial panels, amplifiers, and the like may change. In this case, different characteristics appear in respective partial images, and a clear boundary exists between respective partial images.

The present inventors proposed a method of solving such problem, i.e., making the boundary inconspicuous by extracting components having features that continue in the boundary direction near the boundary and removing these feature components near the boundary (Japanese Patent Laid-Open No. 2000-132663).

This method is very effective when partial images suffer relatively small variations, and implements correction that does not require correction over the entire image by smoothing only the neighborhood of the boundary. However, variations among partial images are often too large to absorb unnaturalness as a whole by only partial correction, and a measure against such case is required. In the above method, when important image information happens to be present at a boundary position and along a boundary, that image information may be damaged by correction. Further, since correction is made after the entire image is obtained, it is difficult to attain a moving image process in nearly real time.

SUMMARY OF THE INVENTION

The present invention has been made in consideration of the above situation, and has as its object to provide a technique for implementing stable correction of differences among partial images over the entire image even for a moving image.

According to the present invention, the foregoing object is attained by providing an image processing apparatus comprising: image processing means for successively obtaining a composite image obtained by compositing a plurality of partial images; and correction means for correcting an offset of each of the plurality of partial images, wherein the correction means corrects the partial images using information of an image captured before an image to be corrected.

According to the present invention, the foregoing object is also attained by providing an image processing apparatus comprising: image processing means for compositing plurality of partial images; and correction means for correcting an offset of each of the plurality of partial images, wherein the correction means corrects the partial images on the basis of a statistical property value of pixel values near boundary between the partial images.

Further, the foregoing object is also attained by providing an image processing method for generating a composite image by correcting a plurality of partial images, comprising: sthe calculation step of calculating correction values using information of an image captured before an image to be corrected; and the correction step of correcting an image using the calculated correction values.

Furthermore, the foregoing object is also attained by providing an image processing method for generating a composite image by correcting a plurality of partial images, comprising: the calculation step of calculating a statistical property value of pixel values near boundary between the partial images; and the correction step of correcting an offset of each of the plurality of partial images using the calculated statistical property value.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 3 is a table of coefficients of respective pixel data;

FIG. 4 is a flow chart showing a process for obtaining offset values among partial images according to the first embodiment;

DETAILED DESCRIPTION OF THE PREFERRED EMBODIMENTS

Preferred embodiments of the present invention will be described in detail in accordance with the accompanying drawings.

<First Embodiment>

Figure 1:
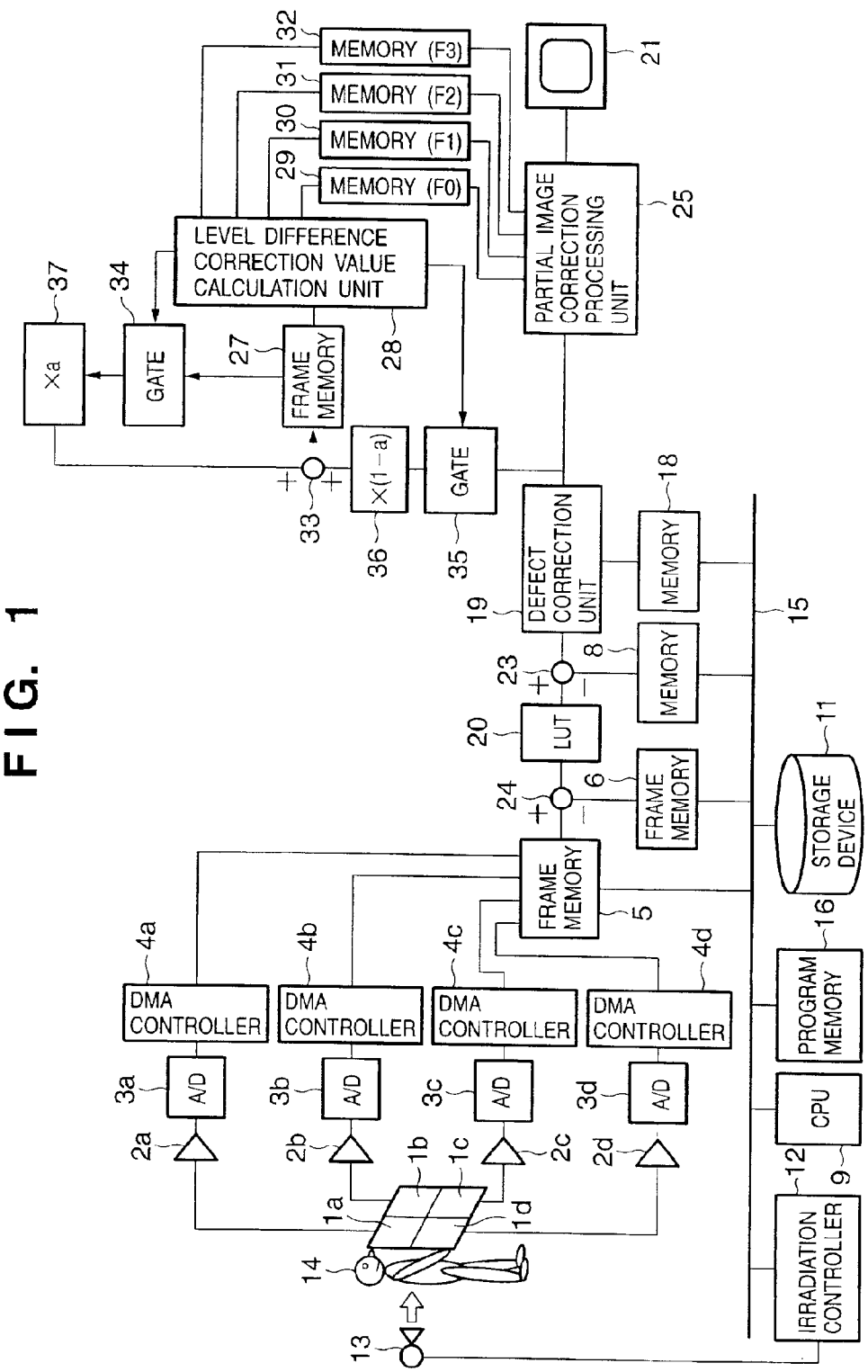
FIG. 1 is a block diagram showing a configuration of an X-ray image processing apparatus according to a first embodiment of the present invention.
Figure 13:
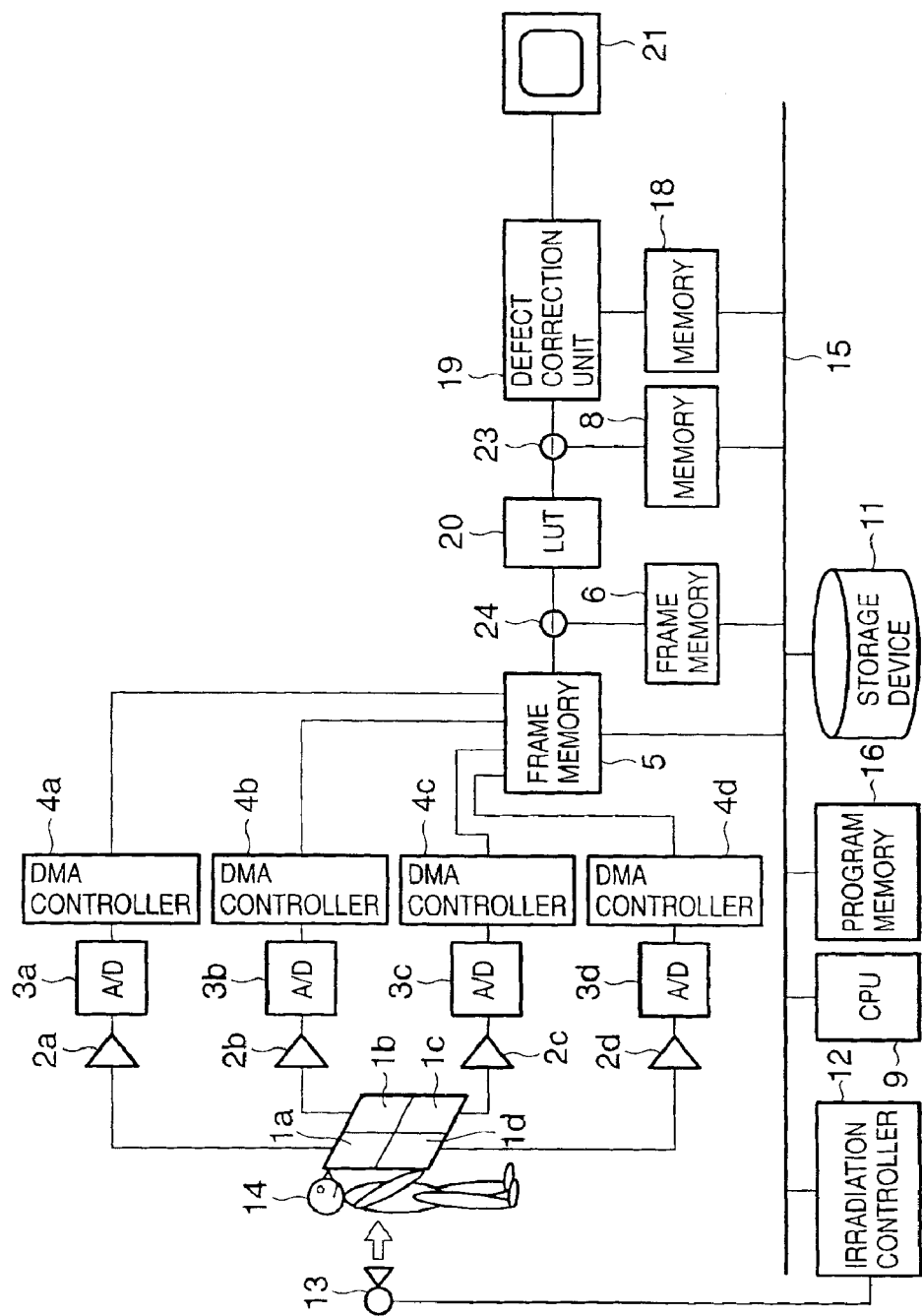
FIG. 13 is a block diagram showing a configuration of a conventional X-ray image processing apparatus.

FIG. 1 shows an example of a system (X-ray image processing apparatus) for capturing an X-ray image according to the first embodiment of the present invention. In FIG. 1, the same units and elements as those in FIG. 13 are referred to by the same reference numerals.

In this system, a single sensor panel is divided into four regions $1a$ to $1d$, which are driven independently. Independent amplifiers $2a$ to $2d$ amplify electrical signals output from the regions $1a$ to $1d$ with gains, A/D converters $3a$ to $3d$ convert the output signals from the amplifiers $2a$ to $2d$ into digital values, and independent DMA controllers $4a$ to $4d$ store partial image data in parallel into a frame memory 5. A line 15 is a bus line of this system, and a central processing unit (CPU) 9 sequentially executes programs stored in a program memory 16 to process data via the bus 15 in this computer system. The frame memory 5 is a dual-port memory from which image data is read out as the read address is controlled by the CPU 9.

The image sensing sequence is as follows. An irradiation controller 12 for an X-ray bulb controls an X-ray generator 13 (bulb) to emit X-rays toward an object (human body) 14. In synchronism with the X-ray irradiation, panel drivers (not shown) drive the sensor panel regions $1a$ to $1d$ (to sequentially drive internal switching transistors) to output electrical signals corresponding to pixels, thus storing an image in the frame memory 5 via the amplifiers $2a$ to $2d$, A/D converters $3a$ to $3d$, and DMA controllers $4a$ to $4d$.

Reference numeral 6 denotes a frame memory. Similar operation as described above is made without emitting any X-rays in order to capture a fixed pattern representing an offset in the frame memory 5, and that pattern is stored in the frame memory 6. Reference numeral 8 denotes a memory which pre-stores gain variation information of each pixel of the sensor panel regions 1a to 1d. This information is normally obtained by irradiating the sensor with X-rays without any object, and capturing that image. The fixed pattern is removed from the captured image, and the resultant image is converted into a logarithmic value.

Reference numeral 20 denotes a look up table (LUT) used for converting pixel data from which the fixed pattern stored in the frame memory 6 is subtracted by a subtractor 24 into a logarithmic value, and outputs the logarithmic value. A subtractor 23 subtracts gain variation data held in the memory 8 from the image data converted into the logarithmic value. A memory 18 pre-stores the positions of pixels that cannot be corrected by using gain variation data (pixels themselves are defective and no data are obtained therefrom), and a defect correction unit 19 corrects pixel data output from the subtractor 23 by interpolating data at the defective pixel positions stored in the memory 18 from surrounding non-defective pixel values.

Figure 2:
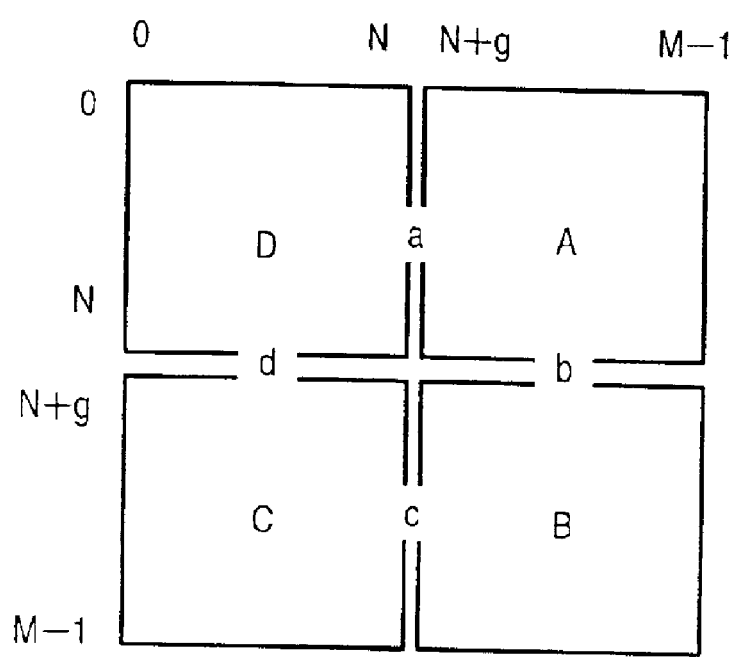
FIG. 2 depicts respective regions of an X-ray sensor shown in FIG. 1.

FIG. 2 shows the concept of image data with defective pixels. In FIG. 2, it is assumed that there is a gap of g pixels between partial images. Such gap may be considered as defective pixels in a way, and if partial images have different levels in general, it is meaningless to execute pixel interpolation using pixels on the both sides of the gap. Hence, correction using the defect correction unit 19 is not applied to such gap in the first embodiment; after levels of respective partial images are corrected as will be described later, the gap are interpolated using, e.g., the average value of neighboring pixel values.

The subsequent processes are basically implemented by hardware but may be implemented by software if a high-speed computer is used.

Image data that has undergone the defective pixel correction process of the defect correction unit 19 is input to and stored in a partial image correction processing unit 25. Since arithmetic operations of the partial image correction processing unit 25 are simple additions and only a boundary region is subject to pixel correction by interpolation, high-speed arithmetic operations can be performed, e.g., within one frame period or in real time. The corrected is output to a display device 21. A level difference correction value calculation unit 28 calculates level difference correction values F0 to F3 for partial images from the statistical property near the boundary of images. The level difference correction value calculation method in the step correction value calculation unit 28 will be described in detail later.

The calculated level difference correction values F0 to F3 are respectively stored in memories 29 to 32, and are read out and used by the partial image correction processing unit 25. Upon completion of the arithmetic calculation of the level difference correction values, the level difference correction value calculation unit 28 opens gates 34 and 35 to fetch image information for the next arithmetic operations.

Reference numeral 35 denotes a gate for the latest captured image data output from the defect correction unit 19. The latest image data passes through the gate 35, and is multiplied by (1−a) (a is an arbitrary set number, and a<1) by a multiplier 36. The product data is supplied to one input of an adder 33.

The gate 34 is used to read out image data from a frame memory 27. This data passes through the gate 34, and is multiplied by a (a<1). The product data is supplied to the other input of the adder 33. The output from the adder 33 is recorded in the frame memory 27 again as image data. The image data in the frame memory 27 is used for statistically calculating level differences between partial images by the level difference correction value correction unit 28. The frame memory 27 must be initialized to "0"s in an early stage of the processing.

The aforementioned arrangement for adding the latest image data and immediately preceding image data multiplied by given coefficients is called a recursive filter, and forms for each pixel a filter having frequency characteristics H(Z) given by:

$$H(Z) = \frac{1-a}{1-aZ^{-1}} \quad (1)$$

where $Z^{-1}$ denotes a one-frame delay. If the one-frame delay is 1/30 sec, the filter exhibits the frequency characteristics shown in FIG. 6.

Figure 6:
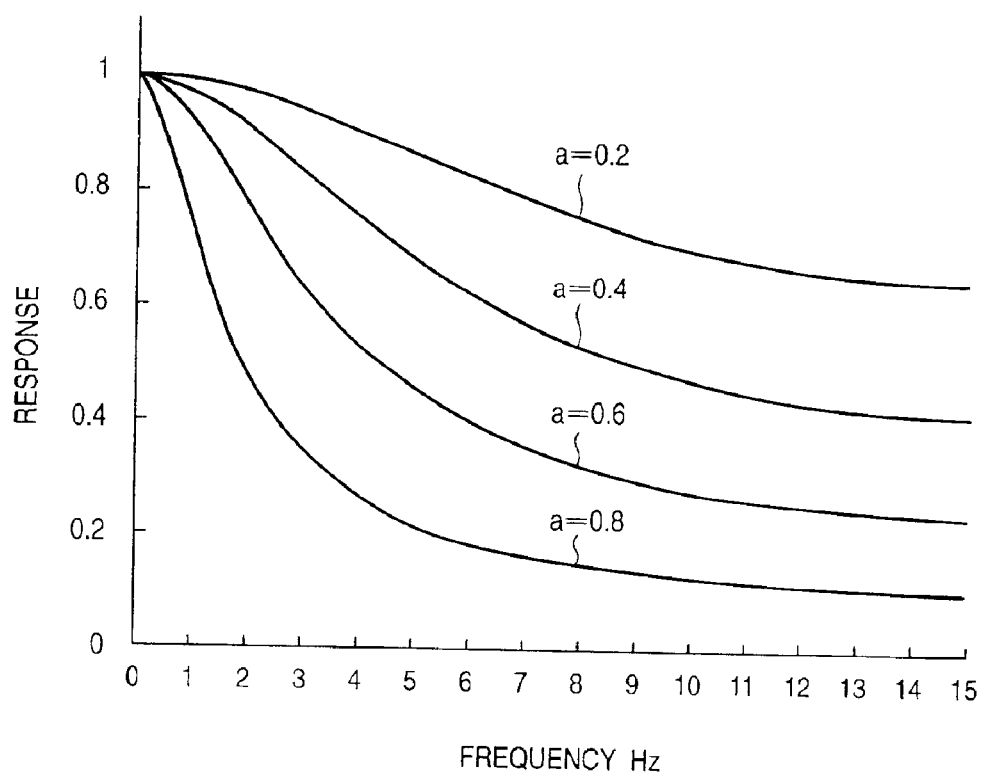
FIG. 6 is a graph showing the characteristics of a general recursive filter.

In FIG. 6, as the value a becomes larger, high-frequency components drop all together, and noise components of image data are reduced greatly. However, each frame image becomes less independent of the former and subsequent frame images.

In this embodiment, this delay does not always match one frame period but indicates the end timing of arithmetic operations of the level difference correction value calculation unit 28, and the contents of the frame memory 27 have no significance as information indicating an image.

In this embodiment, information stored in the frame memory 27 is not used as information indicating an image but is used to calculate level difference values. Since the level difference values do not depend on image information itself but depend on the state of the system, the same effect of correcting an image using correction data obtained from the image to be corrected can be obtained by using correction data obtained from image information acquired at a timing near the capture timing of the image to be corrected. Hence, calculations of correction data and an correction process can be independently done.

The level difference correction value calculation unit 28 calculates offset values F0 to F3 on the basis of data near the boundary of partial image in the contents of the frame memory, and stores them in the memories 29 to 32.

The partial image correction processing unit 25 adds the correction values for offset of respective partial images, stored in the memories 29 to 32 (F0 to F3), to the corresponding partial images, fills the gap of the boundary portion by interpolation, and executes processes such as D/A conversion and the like. After that, the processing unit 25 outputs the obtained image to the monitor 21 as a video signal, thus a moving image is displayed.

Level differences among partial images which appear in an image do not depend on image information containing an object image, but depend on variations of the system along with an elapse of time. Therefore, statistically calculated level difference values near the boundaries of partial images should be independent of the content of image information.

In this embodiment, image data obtained for respective frames are sequentially stored, correction values to be added to respective partial images are statistically extracted from a less noise-loaded image which is insignificant as image information but is significant to correct level difference values, and level differences are corrected by adding stable correction values to partial images. That is, a system for calculating the correction values and a system for correcting level differences of an image operate independently, thus implementing level difference correction at higher speed.

A practical method of obtaining level difference values will be explained below.

Figure 9:
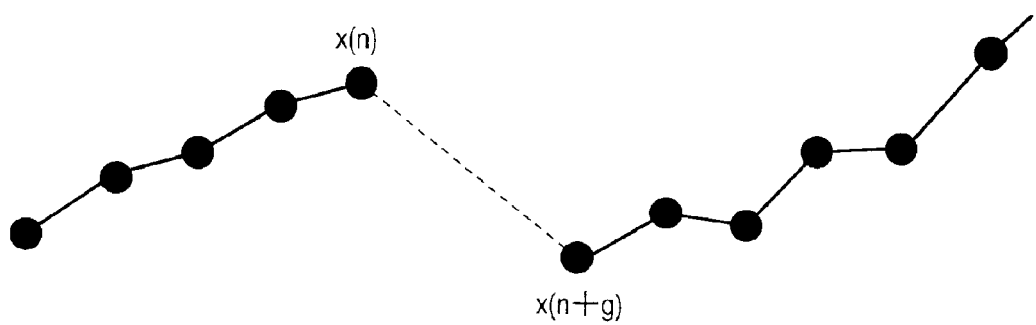
FIG. 9 linearly illustrates level differences among image portions.

In FIG. 9, a linear image is assumed, and $x(0), x(1), \ldots, x(n)$ represent pixel values of a first partial image. Also, $x(n+g), x(n+g+1), \ldots$ represent pixel values of a second partial image which adjoins the first partial image. FIG. 9 is illustrated generally, and assumes that a gap of g pixels is present between partial images.

In this case, an object image should continue on the right and left or upper and lower sides of the boundary. Therefore, the gradient can be considered to be continuous. Let K be the average of the gradient of image data obtained from data $x(0), x(1), \ldots, x(n)$, and the gradient of image data obtained from data $x(n+g), x(n+g+1), \ldots$. A case will be examined below wherein the difference between data is calculated. The difference between pixel values $x(n)$ and $x(n+g)$ of pixels which adjoin across the boundary is $x(n+g)-x(ni)$. Since the gradient is K, the expected difference between the pixel values $x(n)$ and $x(n+g)$ based on this gradient K is gK. The difference between this value gK and the value $x(n+g)-x(n)$ is an expected value d of a substantial level difference, which is $$d = gK + x(n+g) - x(n) \quad (2)$$

The expected value d given by equation (2) defines a practical level difference value. Note that the calculation method is not limited to the above method, and various other methods may be used. For example, differential values may be used. That is, the gradient of the first partial image may be calculated at $x(n)$, the gradient of the second partial image may be calculated at $x(n+g)$, and these gradients may be averaged using data at m points to obtain the gradient K of image data:

$$K = \frac{1}{2m}\left[\sum_{p=1}^{m}\frac{1}{p}(x(n)-x(n-p)) + \sum_{p=1}^{m}\frac{1}{p}(x(n+g+p)-x(n+g))\right] \quad (3)$$

By plugging equation (3) in equation (2), the expected value d is given as, $$d = \frac{g}{2m}\left\{\sum_{p=1}^{m}\frac{1}{p}(x(n)-x(n-p)) + \sum_{p=1}^{m}\frac{1}{p}(x(n+g+p)-x(n+g))\right\} + x(n+g) - x(n) \quad (4)$$

As a result of this arithmetic operation, a level difference between lines having one boundary as a symmetric point is obtained. This arithmetic operation essentially amounts to cumulative additions that multiply pixel values by prescribed coefficients, and cumulate the products.

Since an image includes a plurality of rows and columns, a continuous level difference value sequence $d(i)$; $i=0$ to L is obtained for each boundary. Since each partial image has a plurality of boundaries with other partial images, a plurality of level difference value sequences are present for each partial image. Based on these data, changes in pixel value of the partial image are statistically calculated. This method varies depending on the pattern of the partial image, and must be considered case by case.

Figure 10:
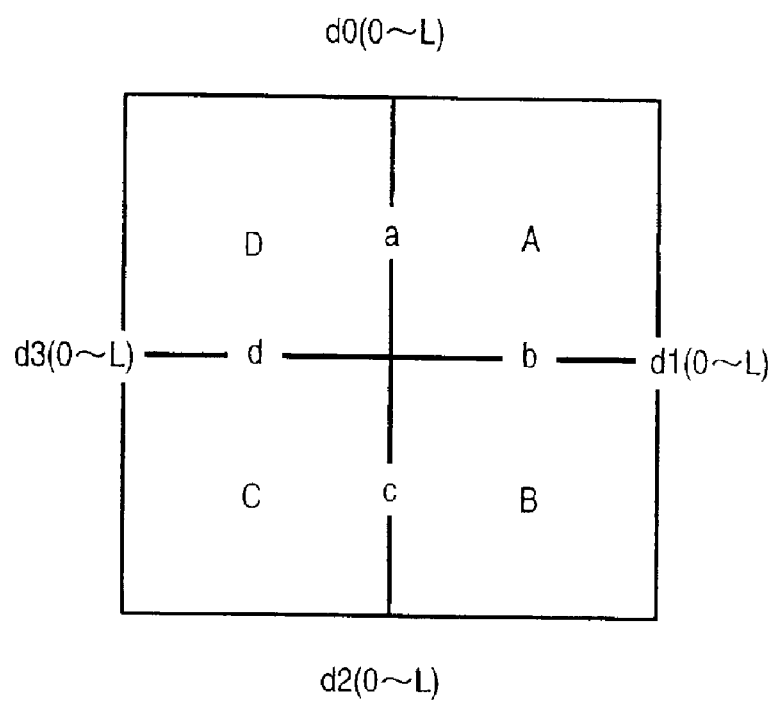
FIG. 10 shows a structure of four partial images.

An example will be explained below. Assume that an image is made up of four partial images A, B, C, and D, as shown in FIG. 10. In this case, four boundaries a, b, c, and d shown in FIG. 10 appear. If the center is defined as an origin, each partial image consists of L×L pixels in the vertical and horizontal directions, and the lower left corner of partial image A is at the origin, level differences calculated by the aforementioned method at those boundaries are expressed as d0(0 to L−1), d1(0 to L−1), d2(−1 to −L), and d3(−1 to −L). At this time, if image data has a format proportional to the signal strength, these level differences correspond to offset values. If image data have been logarithmically converted, these level differences correspond to gain variations. The correction methods used in such cases also vary case by case, and a case will be exemplified below wherein the partial image is corrected by adding/subtracting a constant value.

Figure 11:
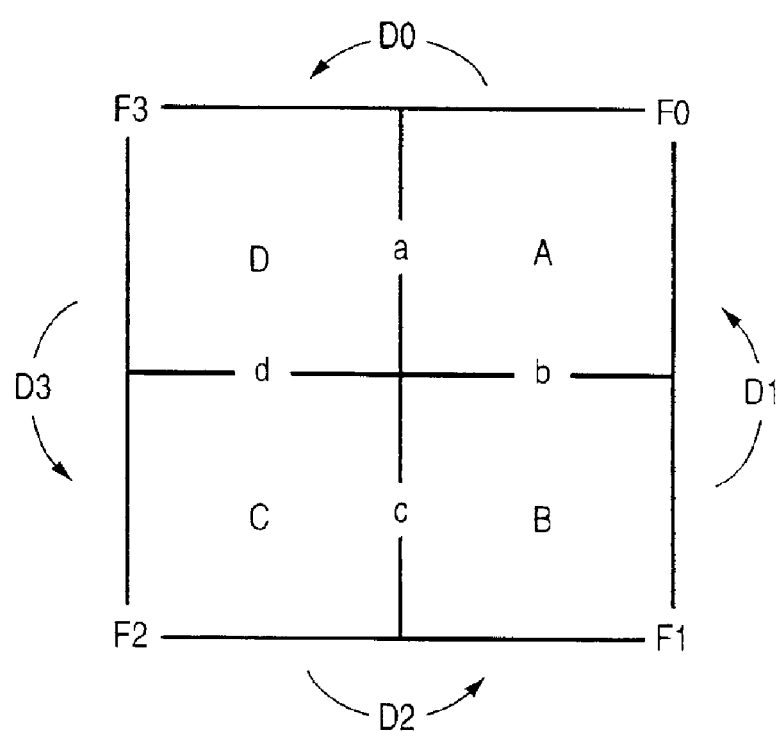
FIG. 11 depicts a method of correcting partial images.

If a constant value is used, the level difference value at each of boundaries a, b, c, and d becomes a single value. Hence, four level difference values D0, D1, D2, and D3 are respectively derived from the level difference value sequences d0(0 to L−1), d1(0 to L−1), d2(−1 to −L), and d3(−1 to −L), as shown in FIG. 11. In this case, each value may be extracted by computing the average value of the corresponding sequence. Alternatively, when many ranges are to be corrected in place of average correction, the mode (histogram peak) of the sequence may be used.

Theoretically, D0+D1+D2+D3=0. However, owing to errors, the influences of image noise, and non-constant offset values, and the like, D0+D1+D2+D3=ϵ ($\neq$0) must be normally considered.

The level differences of the respective partial images are corrected by adding four data F0, F1, F2, and F3 as correction values. If partial image A is a reference image, F0=0.

If D0+D1+D2+D3=0, the same result is obtained by either clockwise or counterclockwise correction. That is, F0=0, F1=D1=−D0−D3−D2; F2=D1+D2=−D0−D3; and F3=D1+D2+D3=−D0.

If D0+D1+D2+D3=ϵ ($\neq$0), this inconsistency is avoided by computing the average of clockwise and counterclockwise corrections. That is, F0=0; F1=(D1−D0−D3−D2)/2; F2=(D1+D2−D0−D3)/2; and F3=(D1+D2+D3−D0)/2. This process corresponds to uniformly distributing errors to overall data. As another method of avoiding such inconsistency, one having a minimum absolute value of D0 to D3 may be replaced by a value obtained by inverting the sign of the sum of the remaining values.

Furthermore, if all values F0 to F3 are positive values, the pixel values of an image can be consequently prevented from becoming negative values. Hence, a minimum value of the values F0 to F3 may be added to all the values.

The process executed in the level difference correction value calculation unit 28 will be described below. Assume that gap g=2. A level difference value is calculated by equation (4) above. Let m=2 in equation (4). Since equation (4) is an operation for multiplying respective pixel values by specific coefficients (C(j), where j=−2 to 4) and add the products, the coefficients are obtained according to a table shown in FIG. 3. In the table shown in FIG. 3, coefficients are categorized into those for computing differentials K for respective "g"s (first term), and those for computing level difference values (second and third terms), and the sum total is computed in the final stage.

From the table in FIG. 3, when linear data sequences that sandwich boundary $x(n+1)$ therebetween undergo an arithmetic operation described by:

$$d(i) = \sum_{j=-2}^{4} c(j)x(n+j) = \frac{1}{4}(x(n+4)-x(n-2)) + \frac{1}{2}(x(n+3)-x(n-1)) - \frac{1}{4}(x(n)-x(n+2)) \quad (5)$$

a level difference value sequence can be obtained in consideration of the gradient of image data as level differences d. In equation (5), i is an index in a direction parallel to the boundary.

Figure 5:
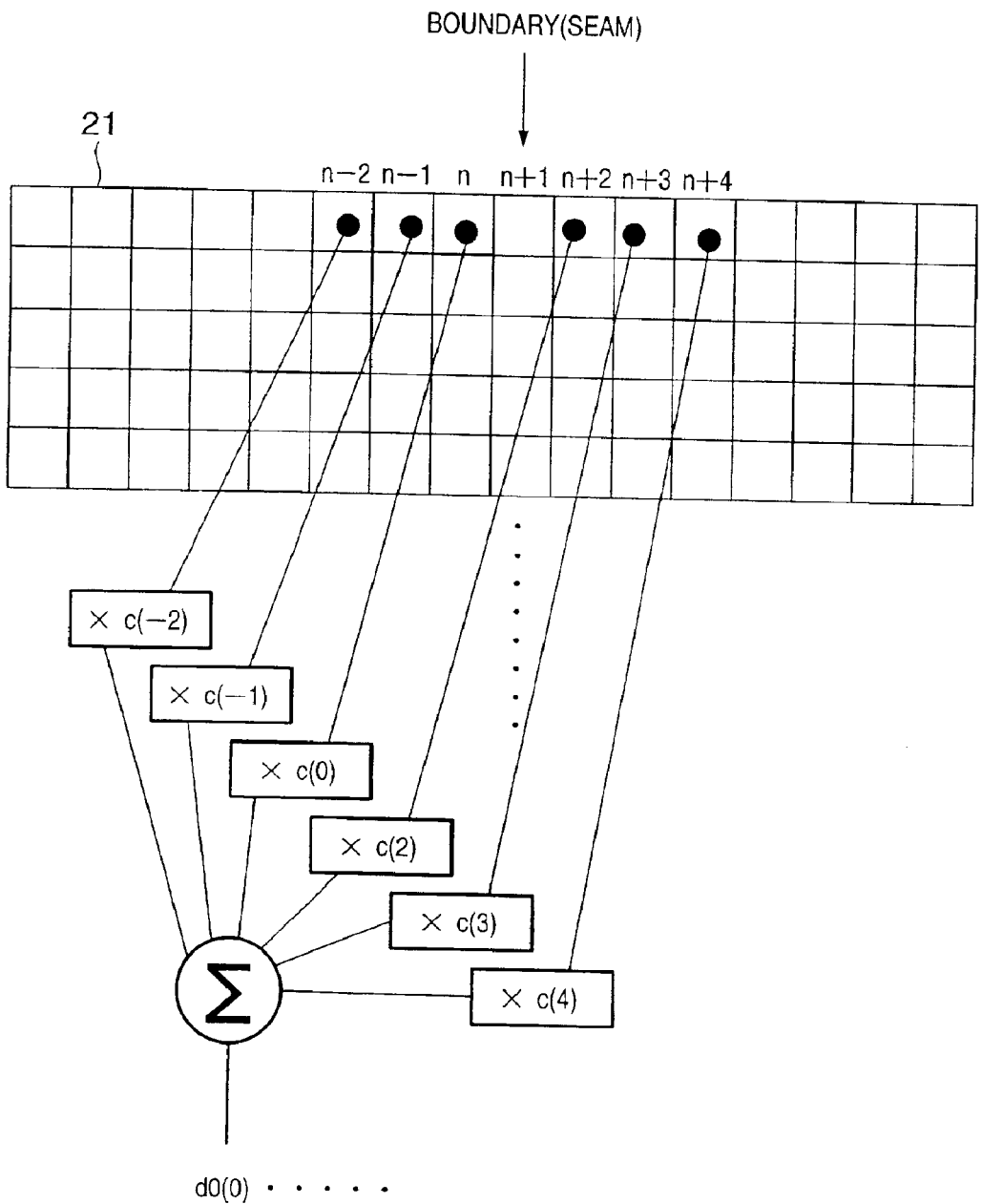
FIG. 5 is a view for illustrating a method of calculating level difference values.

FIG. 5 depicts the concept of equation (5). Reference numeral 21 in FIG. 5 denotes each pixel. In FIG. 5, data are extracted across a boundary, and the arithmetic operation described by equation (5) is made to output d0(i). The same arithmetic operation is made for all boundaries.

The processing operation executed by the level difference correction value calculation unit 28 will be explained below with reference to the flow chart shown in FIG. 4. Using equation (5), four level difference value sequences d0(0) to d0(n) (step S101), d1(n+2) to d1(M−1) (step S102), d2(n+2) to d2(M−1) (step S103), and d3(0) to d3(n) (step S104) are generated for boundaries a to d of partial images A to D shown in FIG. 2.

The modes of the sequences d0(0) to d0(n), d1(n+2) to d1(M−1), d2(n+2) to d2(M−1), and d3(0) to d3(n) are obtained as D0 (step S105), D1 (step S106), D2 (step S107), and D3 (step S108). In place of the mode, a value that represents a distribution of each level difference value sequence such as an average value, central value, or the like may be used.

The offset value F0 to be added to partial image A is set to 0 (step S109), and other offset values F1, F2, and F3 are calculated by F1=(D1−D0−D3−D2)/2 (step S110); F2=(D1+D2−D0−D3)/2 (step S111); and F3=(D1+D2+D3−D0)/2 (step S112).

Since the pixel values of an image basically assume positive values, all F0 to F3 are set to be positive values to guarantee positive pixel values even after the arithmetic operation. More specifically, a minimum value MV of F0 to F3 is extracted (step S113), and MV is added to the respective values to obtain new F0 to F3 (steps S114 to S117).

The operation of the level difference correction value calculation unit 28 has been explained. Since this operation is complicated, it may be implemented by a local microprocessor or it is easy to implement such operation by hardware.

The offset values F0 to F3 obtained by the above operation are set in the memories 29 to 32, and are passed to the partial image correction processing unit 25. The partial image correction processing unit 25 adds the offset correction values F0 to F3 stored in the memories 29 to 32 to partial images of the current frame image, thus correcting level differences.

In the above example, a boundary portion has a one-pixel region having no image data, and such region cannot undergo an interpolation process unless the aforementioned correction for respective partial images is completed. Data for the pixels in this boundary portion, which remain uncorrected, is calculated by interpolation using non-defective neighboring pixel data, and are output.

The output from the partial image correction processing unit 25 undergoes processes such as D/A conversion and the like, and is then input to the monitor 21 as a video signal, thus a moving image is displayed.

As described above, in the image processing apparatus according to the first embodiment of the present invention, level difference information for each partial image is calculated from a previous frame image or previous to current frame images obtained as a moving image, and the current frame image undergoes level difference correction using the calculated level difference information, thus correcting level differences at boundaries even in a moving image.

Further, a frame image used for obtaining correction data may be a frame image obtained by the sensor panel one frame prior to a frame image to be connected. Furthermore, a frame image used for obtaining correction data may be sensed every 10 frame images, for instance, and correction data obtained from the sensed frame image may be used until a next frame image is sensed.

Further, two frame images may be used for obtaining correction data. In this case, two frame images are sensed every 10 frame images, for instance, and correction data obtained from the sensed two frame images may be used until next two frame images are sensed.

Further, according to the first embodiment as described above, level difference values of the boundary of partial images are statistically interpreted to determine correction values (offset or gain) for the entire pixel values in the respective partial images, thus correcting the level differences.

In this embodiment, a logarithmically converted image undergoes correction. Alternatively, when such image is re-converted into linear data using another LUT, level differences due to offset can be corrected.

Although F0 to F3 are not stable for the first several frames regardless of the initial values set to F0 to F3, they gradually become stable independently of the initial values.

Further these offset values may be saved, and these values can be used as the initial values for observing a moving image of another object using the identical system,.

In case of a normal recursive filter, coefficient a cannot be increased so much to accurately capture the motion of an object. However, in this embodiment, the value a is preferably closer to 1 as much as possible to obtain stable level difference data. It should be noted that offset variations cannot be tracked if a is too large.

As described above, according to the first embodiment, when a single X-ray image is formed by compositing a plurality of partial X-ray images, correction values are calculated by statistically obtaining level difference values of boundary portions between partial images using information of an image captured before the image to be corrected, and the image can be corrected using the calculated correction value. Since the system for calculating the correction values and the system for actually correcting an image operate independently, a real-time process for a moving image can be realized.

<Second Embodiment>

Figure 12:
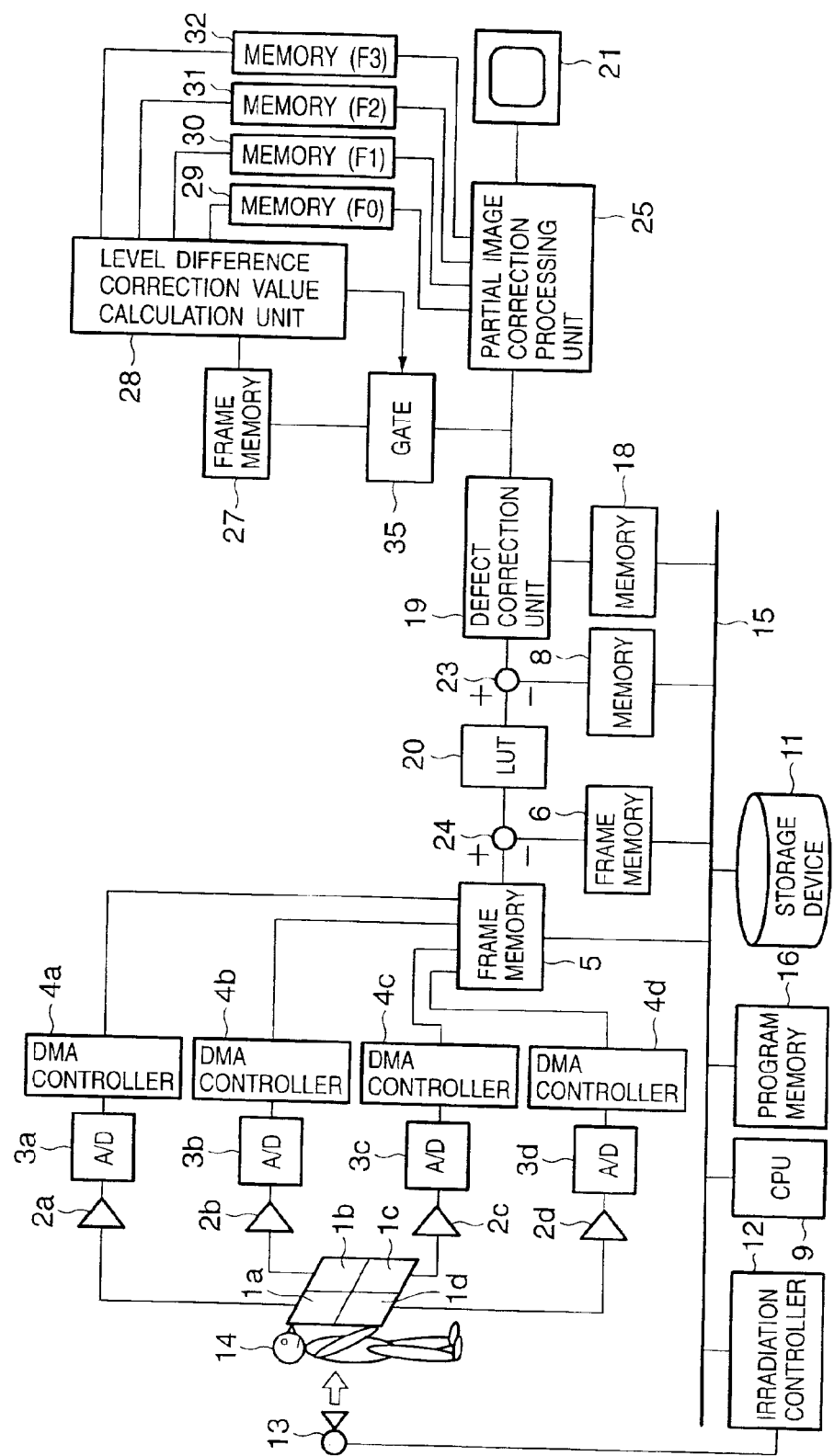
FIG. 12 is a block diagram showing a configuration of an X-ray image processing apparatus according to a second embodiment of the present invention.

In the second embodiment of the present invention, the configuration of the X-ray image processing apparatus of the first embodiment is simplified. As shown in FIG. 12, a function for adding images is omitted from the configuration shown in FIG. 1. When a level difference correction value calculation unit 28 finishes an operation, a gate 35 is opened and the latest image data is written into a frame memory 27. Operations of other elements are the same as those of the first embodiment.

<Third Embodiment>

In the third embodiment of the present invention, offset values F0 to F3 output from a level difference correction value calculation unit 28 shown in FIG. 1 or FIG. 12 undergo recursive filtering using outputs from the level difference correction value calculation unit 28 delayed for a period corresponding to a period of performing one cycle of operation. In this manner a stable offset values are obtained.

Figure 7:
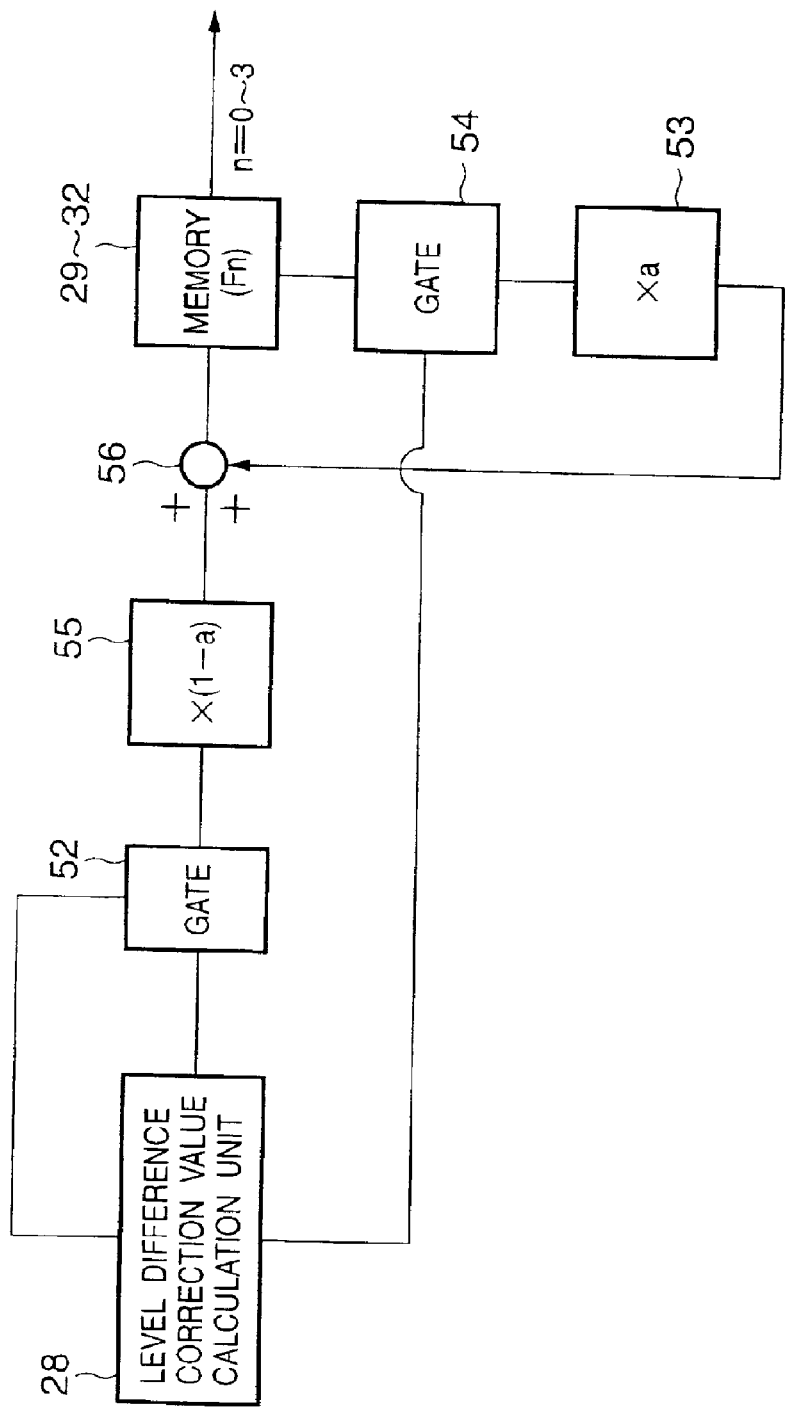
FIG. 7 is a block diagram showing a configuration for calculating an offset value according to a third embodiment of the present invention.

FIG. 7 shows a configuration for processing one of output signals from the level difference correction value calculation unit 28 shown in FIG. 1. In response to the completion of calculation, the output signal is sent to a multiplier 55 via a gate 52, multiplied by (1−a) (a is an arbitrary set number, and a<1), then enters one input of an adder 56. Memories 29 to 32 are read via a gate 54 which also opens at the time of completion of calculation, and the read content is multiplied by a (a<1), and enters the other input of the adder 56. The adder 56 adds these inputs and updates the memory 29 to 32 with the sum.

In this case, the memory 29 to 32 needs to be initialized to 0. Especially, in a system as shown in FIG. 12 which does not add image data, initialization to 0 is an effective way to increase stability.

<Fourth Embodiment>

Figure 8:
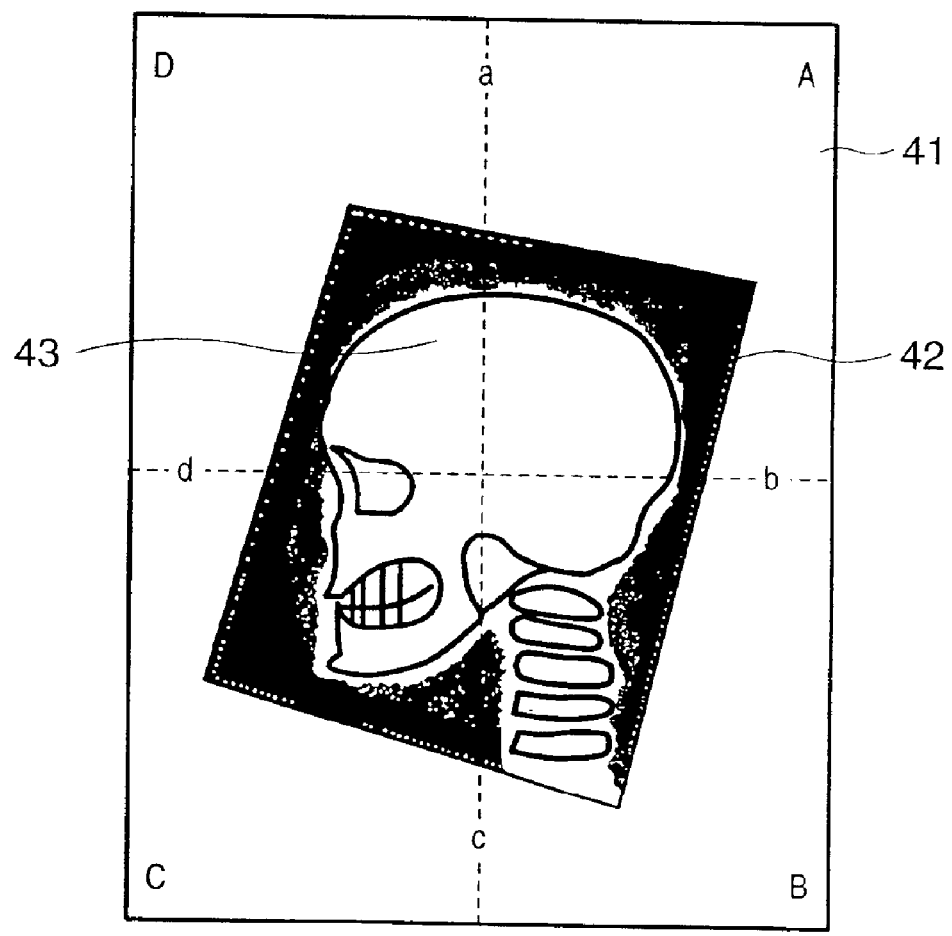
FIG. 8 shows an example of an X-ray image.

FIG. 8 is a schematic view of an X-ray image of a human body used for medical purpose. In FIG. 8, reference numeral 41 denotes an area where X-ray does not incident, and 42 denotes an area where X-ray incidents by masking X-ray emitted from the X-ray bulb by a collimator. Further, reference numeral 43 denotes an area where an image of an object is projected. Note, the area 41 is almost or completely free from X-ray radiation, whereas, the area 42 is exposed to very strong X-ray radiation which did not pass through the object.

The area 43 showing the object may be considered representing an intermediate X-ray intensity. Generally, in an X-ray sensor, the output electric signal is proportional to the intensity of X-ray. However, linearity between the intensity of X-ray and the output electric signal is not always preserved in all the photo sensing area of the X-ray sensor during processes of energy conversion and processes of converting electric signals (e.g., amplification and impedance conversion). Especially, in a portion where the intensity of X-ray is very strong, the relationship between the intensity of X-ray and the output electric signal may be non-linear due to saturation of the electrical system. Further, in a portion where the intensity is very weak, then the intensity of X-ray and the output electric signal may be non-linear due to, e.g., noise and instability of operation of an electric circuit under very low voltage.

However, image information in such areas is often not important, and no problem will arise because of the non-linearity in a conventional case. However, in the present invention, offset components (offsets for image data which is proportional to the intensity of the X-ray, and gains for image data which has undergone logarithmic conversion) of entire partial images are statistically derived from portions of the partial images, therefore, if the portions include substantially a large amount of non-linear data as described above, the proper offset components can not be extracted.

As a countermeasure to the above problem, in the fourth embodiment, an interval where the linearity of sensitivity of the X-ray sensor is reliable is set, and the obtained level difference values are used only when a representative value, such as an average, is known to fall within the set interval at the time of or before calculating level difference values.

In X-ray image sensing for medical purpose in general, an amount of X-ray which passes through an object and reach a sensor is adjusted to its optimum (either an expected amount of X-ray is irradiated toward an object or X-ray radiation is stopped at the time when a proper amount of X-ray is radiated, the radiated amount is measured by an apparatus, called photo-timer, for measuring the amount of the X-ray), linearity in a portion where object information is present is optimum in most of the cases.

More specifically, the reliable area is determined by the average m(i) of data sandwiching a boundary used in equation (5) as shown in equation (6).

$$m(i) = \frac{1}{6}\left(\sum_{j=-2}^{0} x(n+j) + \sum_{j=-1}^{4} x(n+j)\right) \quad (6)$$

A minimum value V0 and maximum value V1 of the reliable interval are determined, and only when $$V0 \leq m(i) \leq V1 \quad (7)$$

d(i) is computed using equation (5). This operation is done within the level difference correction value calculation unit 28.

Operations other than above is the same as those explained in the first embodiment, thus the explanation of them are omitted here.

According to the fourth embodiment as described above, a proper level difference correction and gap interpolation are realized for an X-ray image including a wide non-linear portion.

It should be noted that, in the first to fourth embodiment as described as above, a case of processing an X-ray image is explained. However, the present invention is not limited to this, and applicable to any image sensing apparatus, such as a digital still camera and a digital video camera, which has a configuration of obtaining a frame image by sensing a plurality of partial images and individually processing the partial images.

<Other Embodiment>

The present invention can be applied to a system constituted by a plurality of devices or to an apparatus comprising a single device.

Further, the object of the present invention can also be achieved by providing a storage medium storing program codes for performing the aforesaid processes to a computer system or apparatus (e.g., a personal computer), reading the program codes, by a CPU or MPU of the computer system or apparatus, from the storage medium, then executing the program.

In this case, the program codes read from the storage medium realize the functions according to the embodiments, and the storage medium storing the program codes constitutes the invention.

Further, the storage medium, such as a floppy disk, a hard disk, an optical disk, a magneto-optical disk, CD-ROM, CD-R, a magnetic tape, a non-volatile type memory card, and ROM can be used for providing the program codes.

Furthermore, besides aforesaid functions according to the above embodiments are realized by executing the program codes which are read by a computer, the present invention includes a case where an OS (operating system) or the like working on the computer performs a part or entire processes in accordance with designations of the program codes and realizes functions according to the above embodiments.

Furthermore, the present invention also includes a case where, after the program codes read from the storage medium are written in a function expansion card which is inserted into the computer or in a memory provided in a function expansion unit which is connected to the computer, CPU or the like contained in the function expansion card or unit performs a part or entire process in accordance with designations of the program codes and realizes functions of the above embodiments.

In a case where the present invention is applied to the aforesaid storage medium, the storage medium stores program codes corresponding to the flowchart in FIG. 4 described in the embodiment.

The present invention is not limited to the above embodiments and various changes and modifications can be made within the spirit and scope of the present invention. Therefore to apprise the public of the scope of the present invention, the following claims are made.

What is claimed is:

1. An image processing apparatus comprising:
   image processing means for successively obtaining a composite image obtained by compositing a plurality of partial images; and correction means for correcting an offset of each of the plurality of partial images, wherein said correction means corrects the partial images using information of an image captured before an image to be corrected and a statistical property value of pixel values near a boundary between the partial images, wherein the statistical property value of the pixel values near the boundary is a value obtained by subtracting an expected value of a difference value calculated based on features of image information from difference values between pixel values near the boundary of two partial images that sandwich the boundary therebetween.

2. The apparatus according to claim 1, wherein said correction means corrects the partial images using information of an image acquired in the preceding frame of partial images to be corrected.

3. The apparatus according to claim 1, wherein said correction means corrects the partial images of a plurality of images using common image information.

4. The apparatus according to claim 3, wherein the common image information is information of one or a plurality of frame images obtained every predetermined number of consecutive images.

5. The apparatus according to claim 1, wherein said correction means independently executes a calculation process of correction values used in correction in parallel with a process for correcting the partial images.

6. The apparatus according to claim 1, further comprising:
a plurality of independent image capture means for capturing the plurality of partial images,
wherein said image processing means successively obtains the composite image by compositing the plurality of partial images captured by said independent image capture means.

7. The apparatus according to claim 1, wherein the statistical property value of the level difference values between the partial images is a mode of a plurality of level difference values calculated in association with the boundary between the two partial images.

8. The apparatus according to claim 1, wherein the statistical property value of the level difference values between the partial images is an average value of a plurality of level difference values calculated in association with the boundary between the two partial images.

9. The apparatus according to claim 1, wherein only a range of pixel values which can guarantee linearity of the partial images is used when calculating the statistical property value of the level difference values between the partial images.

10. The apparatus according to claim 1, wherein when boundary portions of the plurality of partial images do not overlap each other, and image data is missing at the boundary portions, said correction means corrects respective partial images, and then generates the missing pixel information by interpolation.

11. The apparatus according to claim 1, further comprising:
image capture means, made up of a plurality of X-ray sensor panels, for generating a plurality of partial images,
wherein said image processing means successively obtains the composite image obtained by compositing the plurality of partial images captured by said image capture means.

12. The apparatus according to claim 11, wherein said correction means corrects on the basis of a statistical property value of pixel values near a boundary between the partial images, and uses only a range of pixel values which can guarantee linearity of the partial images when calculating the statistical property value of the level difference values between the partial images, and the range of pixel values which can guarantee linearity of the partial images is a range excluding pixel values of portions of the X-ray sensor panels which are not irradiated with X-rays, and pixel values of portions of the X-ray sensor panels which are directly irradiated with X-rays which are not transmitted through an object.

13. The apparatus according to claim 11, wherein said image capture means generates an image signal proportional to intensities of X-rays which hit the X-ray sensor panel.

14. The apparatus according to claim 11, wherein said image capture means generates an image signal proportional to logarithmic values of intensities of X-rays which hit the X-ray sensor panel.

15. The apparatus according to claim 1, wherein said correction means corrects the image using information of a plurality of images captured before correction.

16. An image processing apparatus comprising:
image processing means for compositing plurality of partial images; and
correction means for correcting an offset of each of the plurality of partial images,
wherein said correction means corrects the partial images on the basis of a statistical property value of pixel values near boundary between the partial images, and
wherein the statistical property value of the pixel values near the boundary is a value obtained by subtracting an expected value of a difference value calculated based on features of image information from difference values between pixel values near the boundary of two partial images that sandwich the boundary therebetween.

17. The apparatus according to claim 16, wherein the statistical property value of the level difference values between the partial images is a mode of a plurality of level difference values calculated in association with the boundary between the two partial images.

18. The apparatus according to claim 16, wherein the statistical property value of the level difference values between the partial images is an average value of a plurality of level difference values calculated in association with the boundary between the two partial images.

19. The apparatus according to claim 16, wherein only a range of pixel values which can guarantee linearity of the partial images is used when calculating the statistical property value of the level difference values between the partial images.

20. An image processing method for generating a composite image by correcting a plurality of partial images, comprising:
a calculation step of calculating correction values using information of an image captured before an image to be corrected, and a statistical property value of pixel values near a boundary between the partial images, wherein the statistical property value of the pixel values near the boundary is a value obtained by subtracting an expected value of a difference value calculated based on features of image information from difference values between pixel values near the boundary of two partial images that sandwich the boundary therebetween; and a correction step of correcting an image using the calculated correction values.

21. An image processing method for generating a composite image by correcting a plurality of partial images, comprising:

a calculation step of calculating a statistical property value of pixel values near boundary between the partial images; and a correction step of correcting an offset of each of the plurality of partial images using the calculated statistical property value, wherein the statistical property value of the pixel values near the boundary is a value obtained by subtracting an expected value of a difference value calculated based on features of image information from difference values between pixel values near the boundary of two partial images that sandwich the boundary therebetween.

* * * * *